April 28, 1970     J. H. KRAINA     3,508,449
STOP MEANS FOR THREADED TRAVELING MEMBER
Filed June 7, 1968
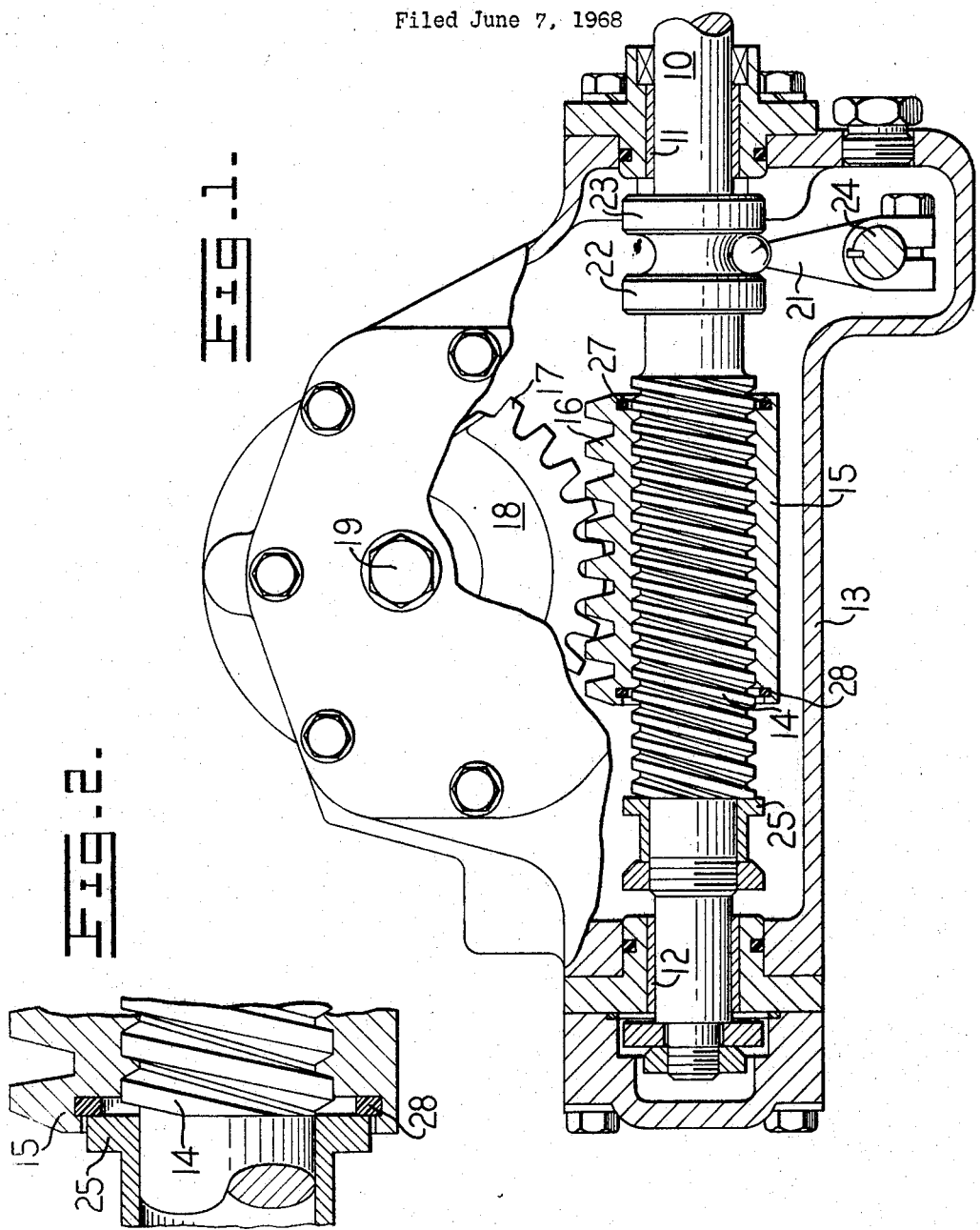
INVENTOR
JACK H. KRAINA
BY
Fryer, Tjensvold, Feix, Phillips + Lempio
ATTORNEYS

United States Patent Office 3,508,449
Patented Apr. 28, 1970

3,508,449
STOP MEANS FOR THREADED TRAVELING
MEMBER
Jack H. Kraina, Aurora, Ill., assignor to Caterpillar
Tractor Co., Peoria, Ill., a corporation of California
Filed June 7, 1968, Ser. No. 735,374
Int. Cl. F16h 25/20
U.S. Cl. 74—89.15                          5 Claims

ABSTRACT OF THE DISCLOSURE

Stop means for an object such as a nut on a threaded shaft where rotary motion of the shaft causes rectlinear movement of the nut toward a fixed stop, including a member which is elastically deformable and has a low coefficient of friction between the nut and the stop to prevent binding of the parts when the nut engages the stop.

---

There are many mechanical devices in which rotating motion is translated into rectilinear motion by a device which includes a threaded shaft and a threaded member on the shaft held against rotation so that rotation of the shaft imparts rectilinear motion to the member which is often referred to as a nut. Examples of such mechanism are disclosed in the patents to Gustafson, No. 2,614,644 and Baer et al., No. 3,130,806. These patents disclose mechanisms for steering articulated vehicles with hydraulic jacks. The steering post of the vehicle is threaded and has a threaded nut-like member thereon. Turning of the steering wheel and its post, therefore, advances the nut in either of two directions which, through suitable linkage, opens a hydraulic valve associated with the steering jacks. Difficulty has been encountered because there are stops to limit the movement of the nut in either direction and when the nut engages a stop, frictional forces occur which make retraction of the nut and steering of the vehicle quite difficult.

The invention will be described herein in reference to a part of the steering mechanism of the kind disclosed in the patents referred to above, but it is to be understood that it is suitable for use in many different types of mechanisms of this general kind.

A more detailed description of the invention follows wherein reference is made to the accompanying drawing, and objects and advantages of the invention will be apparent upon reading of the description.

In the drawing:

FIG. 1 is a view in section of a portion of a steering mechanism such as that disclosed in the patents referred to above and embodying the present invention; and FIG. 2 is a fragmentary view of a part of the mechanism shown in FIG. 1 illustrating the parts in a different position.

Referring first to FIG. 1 of the drawing, a steering post 10 which has a steering wheel not shown at its upper end is rotatably supported in bearings 11 and 12 in a housing 13. Within the housing, the steering post has a threaded portion 14 and a nut 15 is threadedly supported on said portion. On one side the nut has a rack 16 engageable with teeth 17 on a quadrant 18 which is fixed to a shaft 19 for a purpose presently to be described. The shaft 19 is normally held against rotation so the nut 15 is held against longitudinal movement. However, the steering post 10 is permitted limited longitudinal movement in the bearings 11 and 12. A lever 21 in the housing is disposed in a groove between collars 22 and 23 on the post. A shaft 24 to which the lever 21 is fixed is therefore rocked when the steering post is turned. This lever extends through the housing and is connected by suitable linkage, not shown, with a valve which admits fluid to double acting jacks for imparting steering motion to the articulated parts of the vehicle, all as clearly described in the patents referred to above.

The direction of steering, of course, dpends upon the direction in which the steering wheel is turned and consequently the direction of the movement of the lever 21 and valve mechanism controlled thereby. When steering has occurred to the degree dictated by the angular movement of the steering wheel, the valve is closed by followup linkage which acts in response to steering movement of the articulated parts of the vehicle to move shaft 19 and the quadrant 18. This moves the nut 15 and the steering post back to their normal position where the valve which has been opened by rocking of shaft 24 is closed.

Relative longitudinal movement between the steering post and nut is limited by the collar 22 at one end and by a collar 25 at the opposite end. Because the nut, as well as the collars, have previously been made of metal, their engagement with each other has caused friction between the nut and the collar engaged and probably also between the threads of the nut and the threads on the steering post. This friction has often been of such magnitude as to make it difficult to turn the steering wheel away from either of its extreme positions, thus not only causing operator fatigue but also creating a hazardous condition.

The present invention overcomes the difficulties referred to by providing a member of elastically deformable material having a low coefficient of friction in a position to engage the stops rather than permitting engagement between the metal nut and the metal stops. One suitable material for this purpose is Teflon and rings of Teflon are shown in the drawing at 27 and 28 as retained in grooves adjacent the ends of the nut in positions for engagement with the stop collars 22 and 25. The Teflon material is sufficiently resilient to enable it to be snapped into the grooves which are milled into the inner surface of the nut adjacent its ends.

FIG. 2 shows one end of the nut which has moved to an extreme position and has been stopped by engagement of one of the rings with the adjacent stop. Not only does this make the contact less harsh but due to the low coefficient of friction and the relative softness of the material of the ring, the friction occurring between the nut and the stop and throughout the full length of the threads on the nut which are in engagement with the threads on the post is greatly reduced.

What is claimed is:

1. In a mechanical assembly which includes a nut on a threaded shaft to be moved rectilinearly upon rotation of the shaft and stop means fixed with respect to the shaft to limit the movement of the nut means to prevent binding between the nut and stop means comprising a member having low coefficient of friction disposed to prevent direct contact between the nut and the stop means said member being an annulus retained within a groove in the inner wall of the nut adjacent its end.

2. The combination of claim 1 in which said member is elastically deformable.

3. The combination of claim 2 in which the member is an annulus retained within a groove in the inner wall of the nut adjacent its end.

4. The combination of claim 1 with a similar member at each end of the nut.

5. The combination of claim 1 in which the member is made of Teflon.

References Cited

UNITED STATES PATENTS

| | | | |
|---|---|---|---|
| 1,769,705 | 7/1930 | McGee | 85—50 |
| 3,021,721 | 2/1962 | Hooven | 74—424.8 |
| 3,069,151 | 12/1962 | Cook et al. | 74—424.8 |
| 3,144,803 | 8/1964 | Briles | 85—50 |
| 2,941,105 | 6/1960 | Rickenbach | 85—50 |
| 3,277,736 | 10/1966 | Goodman | 74—424.8 |

FRED C. MATTERN, Jr., Primary Examiner

WESLEY S. RATLIFF, Jr., Assistant Examiner

U.S. Cl. X.R.

85—32